DECODING APPARATUS FOR TELEVISION RECEIVERS

Filed March 3, 1949 5 Sheets-Sheet 1

ALBERT COTSWORTH III
RICHARD O. GRAY
PIERCE E. REEVES
INVENTOR.
BY Bruce L Birchard
HIS AGENT

ALBERT COTSWORTH III

RICHARD O. GRAY

PIERCE E. REEVES

*INVENTOR.*

BY

HIS AGENT

ALBERT COTSWORTH III
RICHARD O. GRAY
PIERCE E. REEVES
*INVENTOR.*
BY [signature]
HIS AGENT ALBERT COTSWORTH III
RICHARD O. GRAY
PIERCE E. REEVES
*INVENTOR.*
BY [signature]
HIS AGENT March 24, 1953 A. COTSWORTH III, ET AL 2,632,799

DECODING APPARATUS FOR TELEVISION RECEIVERS

Filed March 3, 1949 5 Sheets-Sheet 5

ALBERT COTSWORTH III
RICHARD O. GRAY
PIERCE E. REEVES
*INVENTOR.*

BY [signature]

HIS AGENT

Patented Mar. 24, 1953

2,632,799

UNITED STATES PATENT OFFICE 2,632,799

DECODING APPARATUS FOR TELEVISION RECEIVERS

Albert Cotsworth III, Oak Park, and Richard O. Gray, Broadview, Ill., and Pierce E. Reeves, Los Angeles, Calif., assignors to Zenith Radio Corporation, a corporation of Illinois Application March 3, 1949, Serial No. 79,432

5 Claims. (Cl. 178—5.1)

This invention relates to decoding apparatus for enabling a television receiver to decode and reproduce coded subscription television signals. It is particularly directed to decoding apparatus for enabling such receivers to decode and reproduce subscription television signals wherein the coding is manifested by variations during spaced operating intervals of the time relation of components constituting the television signal.

Copending application Serial No. 773,848, filed September 13, 1947, by Erwin M. Roschke, entitled "Image Transmission System," now U. S. Patent No. 2,547,598, issued April 3, 1951, and assigned to the present assignee, disclose a type of subscription television system to which this invention is especially applicable. In the Roschke system, television signals coded in a certain manner are radiated to subscriber receivers, and key signals for decoding the television signals are transmitted to the receivers over a line circuit, such as the telephone line. A metering device is included in the line circuit to each subscriber receiver to record the time of use of the key signal by the respective subscribers so that a suitable charge may be made to each subscriber for the subscription service. The coding in this system is effected by altering, at spaced time intervals, the timing of the video-signal component relative to the synchronizing-signal component of the television signal. The times of this alteration are indicated to the receiver by the key signal, and upon receipt thereof, decoding apparatus is actuated at a subscriber receiver to produce a compensating alteration in a timing characteristic of the receiver so that it may decode and reproduce the television signal.

It is an object of the present invention to provide improved decoding apparatus for enabling a television receiver to decode and reproduce subscription television signals of the type in which the coding is effected by a change at spaced operating intervals of the timing of components constituting the television signal.

A more specific object of the present invention is to provide improved decoding apparatus for enabling a television receiver which is normally utilized to reproduce television signals transmitted by present day conventional non-subscription transmitters to be used in subscription systems such as the system disclosed in the aforementioned Roschke application, to decode and reproduce a coded television signal in which the coding is effected by a change at spaced operating intervals of the timing of components constituting the television signal.

Figure 1:
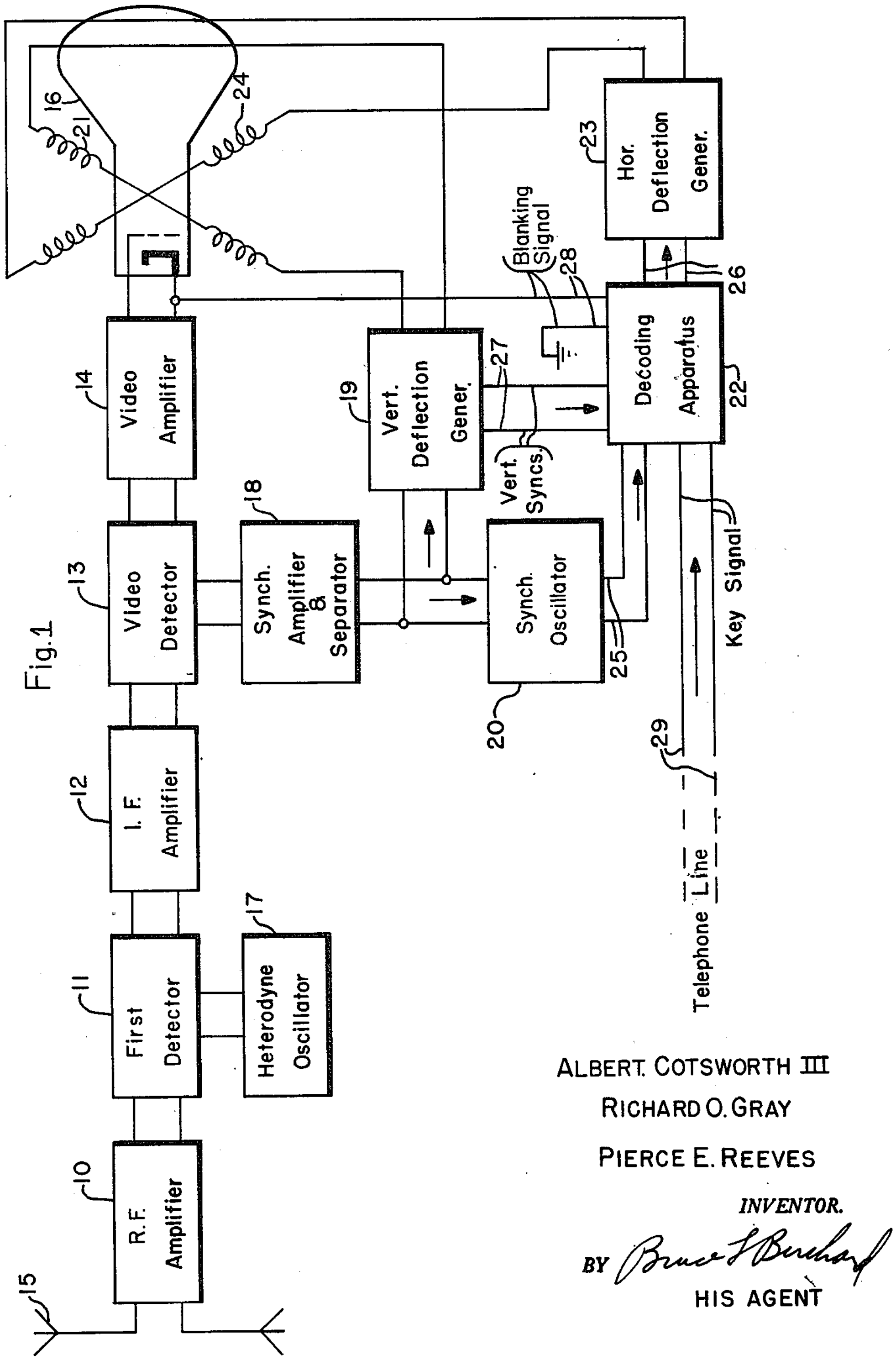
Figure 2:
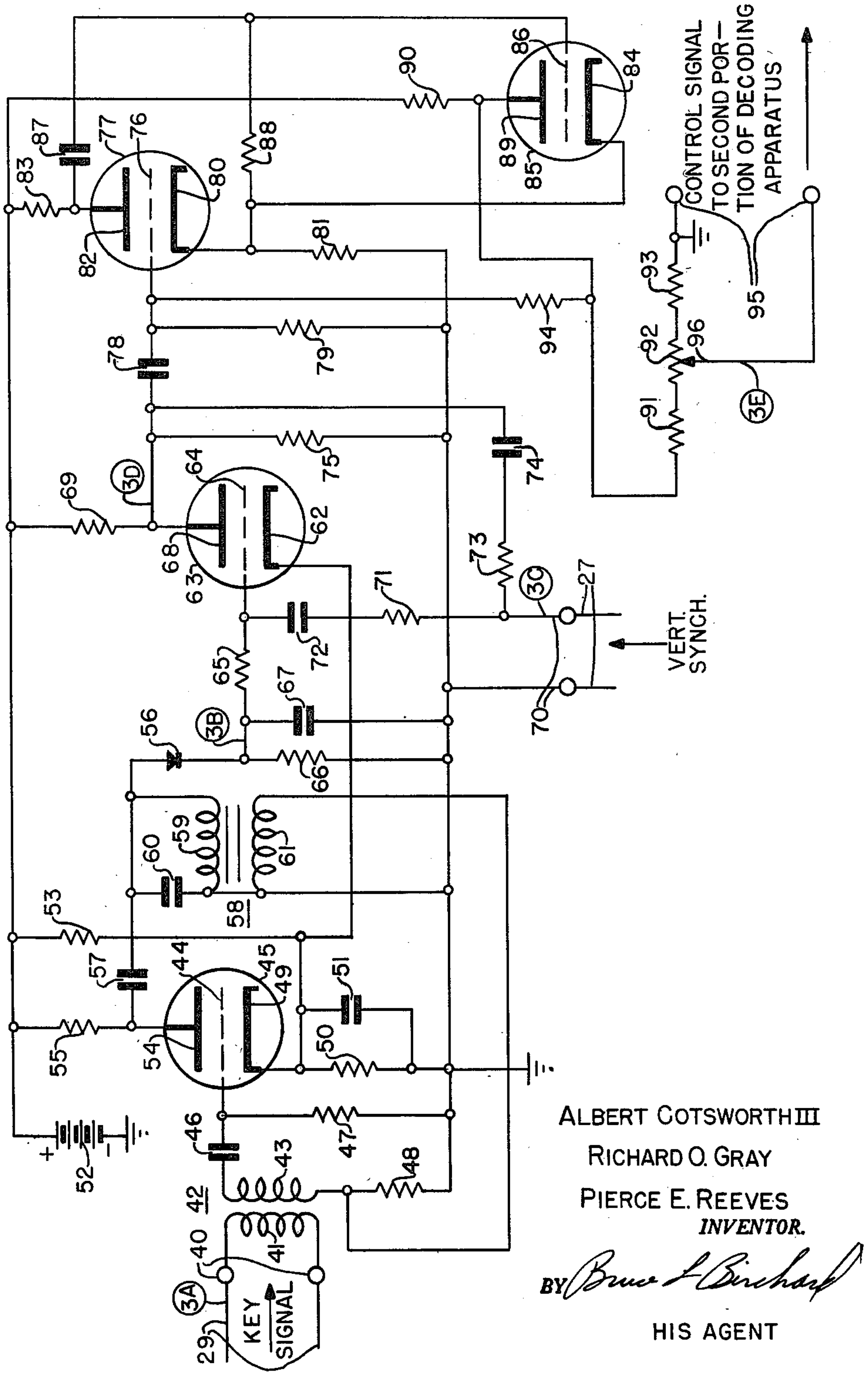
Figure 3:
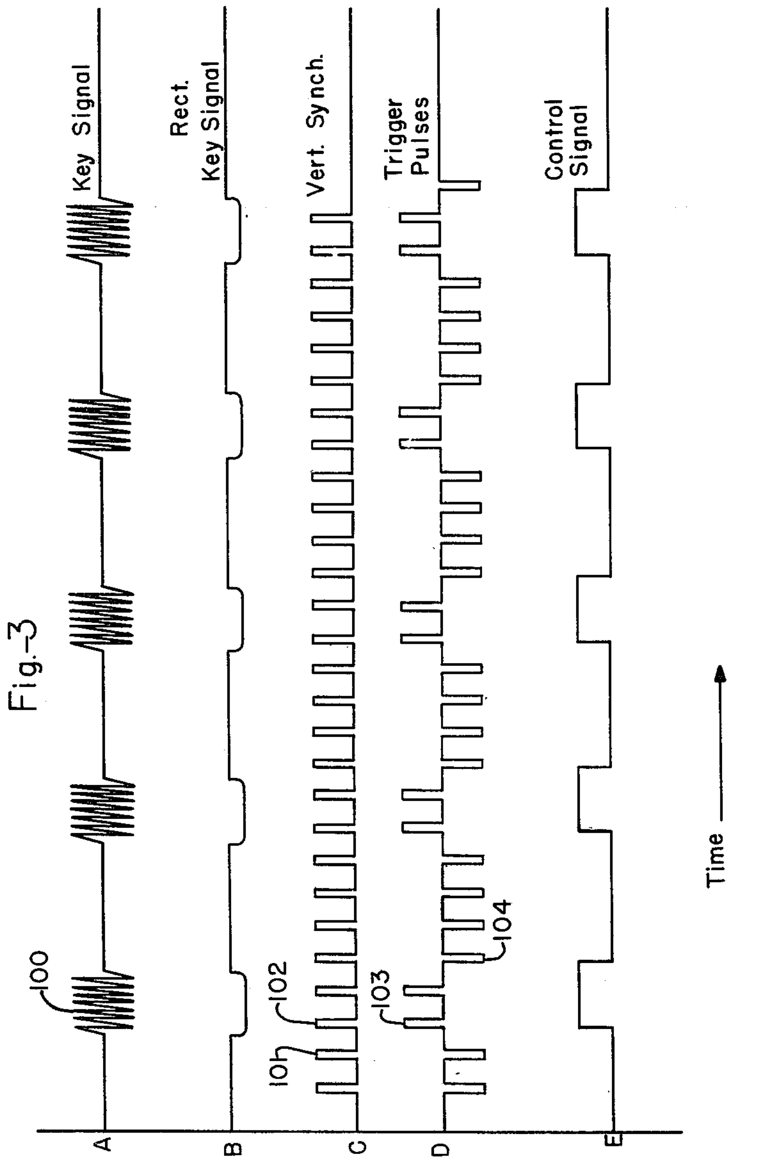
Figure 4:
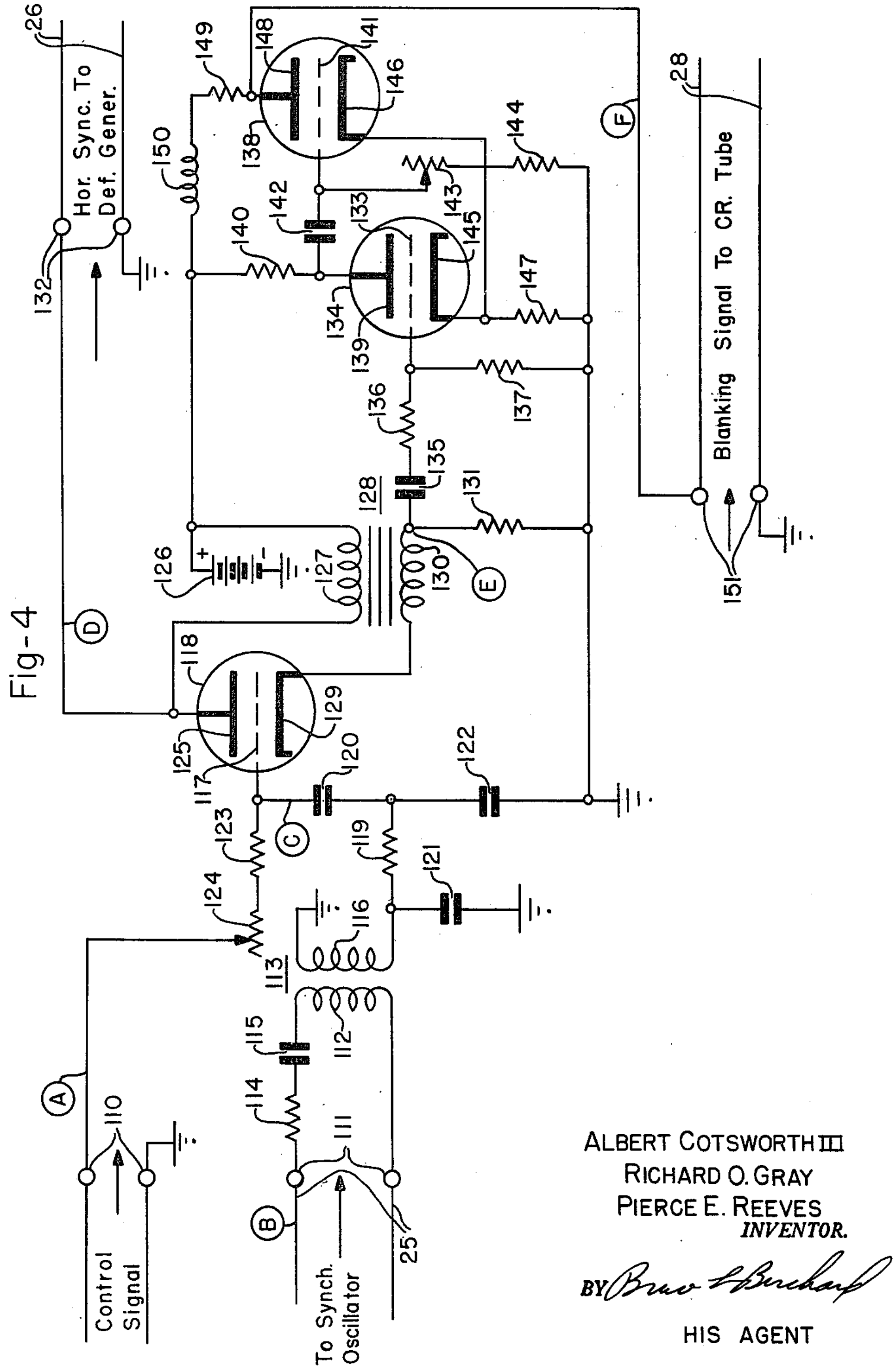
Figure 5:
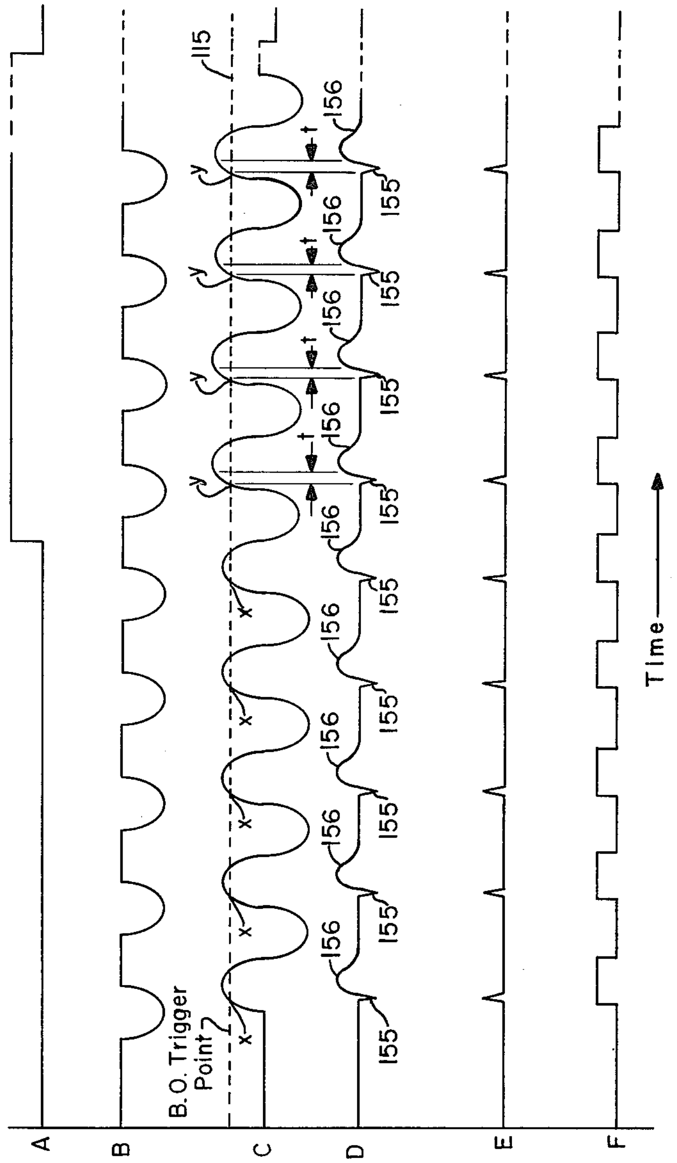

The features of this invention which are believed to be new are set forth with particularity in the appended claims. The invention itself, however, together with further objects and advantages thereof, may best be understood by reference to the following description when taken in conjunction with the accompanying drawings, in which:

Figure 1 shows a block diagram of a television receiver incorporating the present invention, Figure 2 shows a circuit diagram of a portion of the decoding apparatus or adaptor included in the receiver of Figure 1, Figure 3 shows various curves useful in the understanding of the circuit of Figure 2, Figure 4 shows a circuit diagram of a further portion of the decoding apparatus or adaptor included in the receiver of Figure 1, and Figure 5 shows various curves useful in the understanding of the circuit of Figure 4.

Referring now to Figure 1, the television receiver illustrated therein includes the usual cascade connected radio-frequency amplifier 10, first detector 11, intermediate-frequency amplifier 12, video detector 13 and video amplifier 14. The input terminals of the radio-frequency amplifier 10 may be connected to a suitable antenna 15, and the output terminals of the video amplifier 14 are connected to the control electrode and cathode of a receiver image reproducing device, or image tube, 16. A heterodyne oscillator 17 is connected to the first detector 11. Output terminals of the video detector 13 are also connected to the usual synchronizing-signal amplifier and separator 18, the output terminals of which are connected to a vertical deflection generator 19 and to the synchronized oscillator portion 20 of the horizontal scanning system of the receiver. The vertical deflection generator 19 is connected to the vertical deflection coils 21 of the image tube 16. The unit 20 is coupled through decoding apparatus 22 to a horizontal deflection generator 23, this generator being connected to the horizontal deflection coils 24 of the image tube 16.

The decoding apparatus 22 provided in accordance with this invention may be constructed as an adapter for connection into the television receiver, or may be included as an integral part of the receiver. This decoding apparatus is connected to the synchronized oscillator 20 by way of leads 25, and also to the horizontal deflection generator 23 by way of leads 26, to the vertical deflection generator 19 by way of leads 27, to the cathode of the tube 16 by way of leads 28, and, finally, to a line circuit 29, which may be a telephone line extending to the receiver from the subscription transmitter, or other source of decoding signal.

This receiver, with the exception of the decoding apparatus 22, is quite conventional and constructed in accordance with present day standards. Television signals received on antenna 15 are amplified in the radio-frequency amplifier 10, and heterodyned to an intermediate-frequency signal in the first detector 11. The intermediate-frequency signal from the first detector is amplified in the intermediate-frequency amplifier 12, and the video signal is detected by means of the video detector 13. The video intelligence from the detector 13 is amplified in the video amplifier 14, and then impressed between the control electrode and cathode of the reproducing device 16 to control the intensity of the cathode ray beam in this device.

Synchronizing-signal components of a received television signal are separated from the video-frequency components and amplified in the stage 18, and these synchronizing-signal components are used to synchronize the vertical deflection generator 19 and the horizontal deflection generator 23, to cause the image tube 16 to reproduce the image represented by the television signal. The apparatus required at the receiver to reproduce the accompanying sound-signal component of the received television signal forms no part of the present invention, and is not shown.

The function of the decoding apparatus 22 is to enable the receiver to reproduce a coded subscription television signal when the receiver is tuned to receive a signal of this type. The subscription television signal referred to is one which is transmitted in two modes, and accompanied by a key signal which the receiver obtains by means of the line 29. In the first mode of transmission of the subscription signal, the video-signal and synchronizing-signal components thereof have a certain time relation with respect to each other. In the second mode these components have an altered time relation. The changes in mode in the subscription signal are effected at spaced operating intervals, and the key signal indicates to the receiver the times of these changes.

The decoding apparatus is coupled into the horizontal scanning system of the receiver between the synchronized oscillator stage 20 and the horizontal deflection generator 23. The decoding apparatus 22 is responsive to the coincidence of a burst of key signal received over the line circuit 29 and to a vertical-synchronizing pulse received over the leads 27, to change the timing of the horizontal-synchronizing pulses, passing from the leads 25 to the leads 26, at spaced time intervals determined by the bursts of key signal. The operation of the decoding apparatus in changing the timing of the horizontal-synchronizing pulses occurs in synchronism with similar changes in the time relation between the video-signal component of the received subscription signal and the synchronizing-signal components thereof. The decoding apparatus is arranged to alter the timing of the horizontal scanning of the image tube 16 in this manner by a correct amount and in the correct sense to compensate for such changes in the subscription television signal. Therefore, the tube 16 reproduces an undistorted image from this signal.

The decoding apparatus 22 also produces a blanking signal on the leads 28, the timing of which changes in correspondence with the alteration in the timing of the horizontal scanning of tube 16. This blanking signal is applied to the tube 16 and effectively blanks this tube during certain portions of the horizontal trace intervals in which the tube is not blanked by the horizontal blanking pedestals contained in the received signal. This blanking of the tube 16 by the blanking signal from the decoding apparatus 22 eliminates edge flicker which arises in the corrected reproduced image. A complete discussion of the cause and elimination of this edge flicker may be found in copending application Serial No. 74,821, filed February 5, 1949, entitled Subscription Type Signal Translating Apparatus, by Richard O. Gray, now U. S. Patent No. 2,572,853, issued October 30, 1951, and assigned to the present assignee.

The decoding apparatus 22 may be considered as composed of two portions. The function of the first portion is to produce a control signal which changes characteristics in response to the next succeeding vertical synchronizing pulse after the initiation of a burst of key signal, and also to the next suceeding vertical synchronizing pulse after the termination of such burst. This first portion is connected to the line circuit 29, and by means of leads 27, to the vertical deflection generator 19. The function of the second portion of the decoding apparatus is to alter the timing of the synchronizing signal from the synchronized oscillator 20 during intervals determined by the control signal, and to supply this synchronizing signal in its altered and unaltered state to the horizontal deflection generator 23. The external connections of the second portion, therefore, extend to the synchronized oscillator 20 and to the horizontal deflection generator 23.

In this manner, the first portion of the decoding apparatus 22 actuates the second portion during the spaced operating intervals when the timing of the components of the received subscription signal is altered. The second portion of the decoding apparatus, in response to such actuation, controls the scanning of the image tube 16 to alter the timing thereof in a sense and by the correct amount to compensate for such alteration in the timing of the components.

The portion of the decoding apparatus 22 which is connected to the line circuit 29, and to the vertical deflection generator 19 as shown in Figure 2, and this portion comprises a pair of input terminals 40 which are connected to the primary winding 41 of a coupling transformer 42. One terminal of the secondary winding 43 of the transformer 42 is coupled to the control electrode 44 of the electron-discharge device 45 through a coupling capacitor 46, this control electrode being connected to ground through a grid-leak resistor 47. The other terminal of the secondary winding 43 is connected to ground through a resistor 48. The cathode 49 of the discharge device 45 is connected to ground through a biasing resistor 50, this resistor being shunted by a by-pass capacitor 51, and this cathode being further connected to the positive terminal of a source of unidirectional potential 52 through a resistor 53. The anode 54 of the device 45 is connected to the positive terminal of the source 52 through a load resistor 55, and this anode is coupled to one side of a rectifying device 56 through a capacitor 57. Regeneration is provided for the circuit of device 45 by means of a transformer 58. One terminal of the primary winding 59 of the transformer 58 is directly connected to the common junction of the capacitor 57 and rectifying device 56, and the other terminal of this winding is connected directly to ground and is coupled to this common junction through a capacitor 60. One terminal of the secondary winding 61 of the transformer 58 is connected to ground, and the other terminal of this winding is connected to the common junction of the resistor 48 and the winding 43. The cathode 49 of discharge device 45 is connected to the cathode 62 of an electron-discharge device 63, and the other side of the rectifying device 56 is connected to the control electrode 64 of device 63 through a resistor 65. The rectifying device 56 is also connected to ground by means of a resistor 66 connected to the common junction of device 56 and resistor 65, the resistor 66 being shunted by a capacitor 67. The anode 68 of device 63 is connected to the positive terminal of the source 52 through a load resistor 69.

One of a pair of vertical synchronizing pulse input terminals 70 is connected to ground. The other terminal 70 is coupled to the control electrode 64 through a series-connected resistor 71 and capacitor 72, and this terminal is also connected to the anode 68 through a series-connected resistor 73 and capacitor 74, the resistor 75 being connected between the anode 68 and ground.

The anode 68 of the device 63 is coupled to the control electrode 76 of an electron-discharge device 77 through a capacitor 78, this control electrode being connected to ground through a grid-leak resistor 79. The cathode 80 of device 77 is connected to ground through a biasing resistor 81, and the anode 82 of this device is connected to the positive terminal of source 52 through a load resistor 83. The cathode 80 of device 77 is directly connected to the cathode 84 of a discharge device 85, and the anode 82 of device 77 is coupled to the control electrode 86 of device 85 through a coupling capacitor 87, the control electrode 86 being connected to the cathode 84 through a resistor 88. The anode 89 of device 85 is connected to the positive terminal of the source 52 through a load resistor 90, and this anode is connected to ground through series-connected resistors 91, 92 and 93. The junction of the anode 89 of device 85 and the resistor 91 is connected to the control electrode 76 of device 77 through a balancing resistor 94. One of the output terminals 95 is connected to ground, and the other is connected to a movable tap 96 on the resistor 92.

The operation of the circuit of Figure 2 may best be understood by reference to Figure 3. Bursts of key signal, such as are indicated by the curve 3A, are received over the line circuit 29 and impressed across the terminals 40. As previously stated, these bursts indicate the time intervals during which the timing of the video-signal component of the received subscription television signal is altered with respect to the synchronizing-signal component thereof. As pointed out in the Roschke application, the changes from the normal mode to the altered mode of transmission of the subscription signal are effected at the transmitter, preferably, during vertical retrace intervals to avoid distorting the television image, which would occur if such changes were made during trace intervals. As also pointed out in the Roschke application, each burst of key signal is preferably transmitted over the line circuit one field period before the corresponding change in mode to allow for delays that usually occur in this circuit. Therefore, the decoding apparatus at the receiver must be arranged to receive these bursts in such a manner as to enable the vertical-synchronizing pulse succeeding the initiation of each of these bursts to actuate the decoding apparatus from a first to a second position, and the vertical-synchronizing pulse succeeding the termination of each of these bursts to actuate the decoding apparatus from the second position back to the first position. With this arrangement, compensating changes at the receiver are made to occur simultaneously with changes from mode to mode of the received subscription signal.

The bursts of key signal shown in the curve 3A, which are impressed across the terminals 40, are amplified by the circuit of the discharge device 45. The amplifier is made regenerative by reason of the connections of the transformer 58 and resistor 48 which act to supply a portion of the output signal of the device 45 back to the control electrode 44 in proper phase to provide such regeneration. To prevent noise signals and the like from affecting the decoding apparatus, the amplifier is made to respond only to signals above a certain threshold by reason of the positive bias on the cathode 49 due to the potentiometer arrangement of the resistors 53 and 50. The amplified key signal bursts from the device 45 are rectified in the rectifying device 56 and negative-polarity pulses represented in the curve 3B appear across the resistor 66.

The vertical-synchronizing pulses derived from the generator 19 of Figure 1 are shown in the curve 3C, and these pulses are impressed across the terminals 70 by way of the leads 27. The burst 100 of key signal shown in the curve 3A is initiated at the transmitter by a vertical-synchronizing pulse corresponding to the pulse 101 in curve 3C. Due to the possibilities of a time delay occurring in the line circuit 29, the burst 100, when received by the receiver, may have shifted along the time axis in relation to the initiating pulse 101 which is received by air, and this shift is shown in Figure 3. However, as previously stated, the key signal bursts are transmitted a field period before a change in the transmitted signal from one mode to the other is made. Hence, such change in mode is made at the transmitter by the vertical-synchronizing pulse corresponding to the pulse 102. Therefore, the decoding apparatus at the receiver, under these circumstances, is arranged so that changes in the characteristics of the receiver to compensate for such changes in mode are initiated by the vertical synchronizing pulse 102. To this end, the rectified negative-polarity bursts of key signal shown in 3B are impressed on the control electrode 64 of device 63, and the positive polarity vertical synchronizing pulses from the terminals 70 are also impressed on this control electrode. The device 64 is arranged to have an amplification factor of 2, and its characteristics are such that in the presence of each rectified burst of key signal of the curve 3B the device is nonconductive and the vertical synchronizing pulses are not translated thereby. However, in the intervals between the rectified bursts of key signal, the device 63 is conductive and the positive polarity vertical synchronizing pulses applied to the control electrode 64 are amplified by this device and supplied to the control electrode 76 of the device 77 as negative polarity pulses of twice their original amplitude. However, the positive polarity vertical pulses are continuously supplied to the device 77 by means of the circuit including the resistor 73 and capacitor 74. Therefore, the net result is that pulses are supplied to the control electrode 76 of the device 77 which change polarity after the initiation and after the termination of each rectified burst, such pulses being shown in the curve 3D.

The discharge devices 77 and 85 are connected to constitute a conventional single-shot multivibrator circuit. Assuming that in the initial state of the multivibrator circuit the device 85 is conductive and device 77 is non-conductive, the multivibrator is maintained in this initial state until a positive polarity pulse, such as the pulse 103 of the curve 3D trips the multivibrator into its secondary state. Positive pulses immediately succeeding the pulse 103 have no effect on the multivibrator; but the next negative pulse, such as the pulse 104 of the curve 3D, acts to return the multivibrator to its inital state.

Therefore, a control signal such as shown in the curve 3E is obtained across the resistors 91, 92 and 93 and hence across the terminals 95, the amplitude of this control signal appearing across the terminals 95 being adjustable by means of the variable tap 96. This control signal has amplitude changes determined by the vertical synchronizing pulses immediately succeeding the initiation and termination of the individual bursts of key signal received on the line 29. Therefore, the amplitude changes in the control signal from a minimum to a maximum and from a maximum to a minimum occur in synchronism with changes in mode of the received subscription television signal.

The control signal shown in the curve 3E is impressed across the terminals 110 of the circuit of the second portion of the decoding apparatus shown in Figure 4. The pulses of this control signal actuate this second portion to change the timing of the horizontal synchronizing signals passing therethrough during spaced time intervals corresponding to the intervals during which the received subscription television signal is in its second or altered mode.

The circuit of Figure 4 includes a pair of input terminals 111 which are connected to the synchronized oscillator 20 of Figure 1 by way of the leads 25. The terminals 111 are further coupled to the primary winding 112 of a transformer 113 through a series-connected resistor 114 and capacitor 115. One end of the secondary winding 116 of the transformer 113 is grounded, and the other end is coupled to the control electrode 117 of an electron-discharge device 118 through a series-connected resistor 119 and capacitor 120. The common junction of the winding 116 and the resistor 119 is coupled to ground through a capacitor 121, and the common junction of resistor 119 and capacitor 120 is coupled to ground through a capacitor 122, resistor 119 and capacitor 122 forming a phase shifting network.

One of the terminals 110, is grounded and the other is connected to the control electrode 117 of the device 118 through a series-connected resistor 123 and an adjustable resistor 124. The device 118 is connected as a conventional blocking oscillator. The anode 125 of this device is connected to the positive terminal of a source of unidirectional potential 126 through the winding 127 of a transformer 128. The cathode 129 of the device 118 is coupled to ground through the winding 130 of the transformer 128 and a series-connected resistor 131. The anode 125 of device 118 is connected to one of the output terminals 132, the other of these terminals being grounded. The terminals 132 are connected to the horizontal deflection generator 23 of Figure 1 through leads 26.

The common junction of the resistor 131 and the winding 130 is coupled to the control electrode 133 of an electron-discharge device 134 through a series-connected capacitor 135 and a resistor 136, the control electrode 133 being connected to ground through a grid-leak resistor 137. The device 134 and a further electron-discharge device 138 are connected to form a conventional single-shot multivibrator circuit. The anode 139 of the device 134 is connected to the positive terminal of the source 126 through a load resistor 140, and this anode is coupled to the control electrode 141 of the device 138 through a coupling capacitor 142, this control electrode being connected to ground through a series-connected adjustable resistor 143 and a resistor 144. The cathode 145 of the device 134 is directly connected to the cathode 146 of the device 138, and these cathodes are connected to ground through a common cathode resistor 147. The anode 148 of the device 138 is connected to the positive terminal of the source 126 through a series-connected resistor 149 and a radio-frequency choke coil 150. The anode 148 is also connected to one of the output terminals 151, the other of these terminals being grounded. The output terminals 151 are connected to the cathode of the image tube 16 of Figure 1 by way of the leads 28.

The operation of the portion of the decoding apparatus shown in Figure 4 may best be understood by reference to Figure 5. The curve 5A shows the control signal which is impressed across the terminals 110. This control signal is the signal shown by the curve 3E of Figure 3, but is illustrated herein on an expanded time base for purposes of clarity. The control signal is impressed on the control electrode 117 of the discharge device 118, and its amplitude and, hence, the timing of the blocking oscillator may be adjusted by adjustment of the tap 96 of Figure 2. The output signal from the synchronized oscillator 20 of Figure 1 is applied to the terminals 25 and this signal has the usual form, as shown by the curve 5B, with negative sine wave peaks occurring at the horizontal synchronizing frequency of the received signal. These peaks are passed through a network which consists of the resistor 114, the capacitor 115 and the primary winding 112 of the transformer 113, and they appear across the secondary winding 116 as a sine wave having a frequency equal to the horizontal synchronizing frequency, the secondary winding and capacitor 121 forming a resonant circuit tuned to the repetition frequency of the sine-wave peaks. This sine wave is phase shifted in the network 119, 122 and the phase shifted sine wave, together with the control signal of the curve 5A, are impresed upon the control electrode 117 of the blocking oscillator discharge device 118. The combined signal impressed thereon has the form shown in the curve 5C.

The signal impressed on control electrode 117 of the device 118 controls the timing of the blocking oscillator. The triggering point of the blocking oscillator discharge device 118 is shown by the dotted line 115 of the curve 5C, and may be adjusted by adjustment of resistor 124, since this resistor, together with the resistors 92 and 93 of Figure 2, forms the discharge path of the capacitor 120. Whenever the signal on the control electrode 117 increases in a positive direction across the dotted line 115, the blocking oscillator is actuated from one condition to the other. Hence, when the control signal of the curve 5A has a minimum amplitude, the sine wave portion of the curve 5C triggers the blocking oscillator at the points designated as $x$, and when this control signal has a maximum amplitude, the sine wave trips the blocking oscillator at the points designated as $y$. Therefore, during the intervals when the maximum amplitude portion of the control signal of 5A is present, the timing of the blocking oscillator is advanced a certain time interval designated as $t$. As previously stated the value of the time interval $t$ can be varied by adjustment of the tap 96, which adjustment controls the amplitude of the maximum potential portion of the control signal applied to the control electrode 117 of the device 118.

Each time the blocking oscillator is triggered, a signal such as shown in the curve 5D appears at the anode 125 of the device 118. This signal has negative-polarity peaked portions 155 and positive-polarity pulse portions 156, as shown. The positive-polarity pulses 156 of the curve 5D appear across the terminals 132 and are used to synchronize the horizontal deflection generator 23 of Figure 1 with the horizontal synchronizing-signal component of the received television signal.

The timing of the pulses 156 of the curve 5D is changed each time the mode of transmission of the television signal is changed, and therefore the timing of the horizontal scanning of the image tube 16 of Figure 1 is altered in synchronism with such changes in mode. The arrangement is such that such alteration of the timing of the horizontal scanning of the image tube is of the correct amount and in the appropriate sense to compensate for changes in mode in the received subscription signal and to enable the image tube to reproduce an undistorted image from this signal.

To blank the image tube 16 at appropriate intervals and thus avoid edge flicker in the reproduced image, the decoding apparatus is arranged to produce blanking pulses which are impressed on the cathode of this tube. The timing of the blanking pulses is altered concurrently with the timing of the horizontal synchronizing pulses from the decoding apparatus 22 as the received subscription television signal changes from one mode to the other. To produce such blanking pulses, the peaked pulses of positive polarity shown in the curve 5E and which appear across the cathode resistor 131, are used to trigger a multivibrator which is formed by the circuit of the devices 134 and 138. The multivibrator circuit has a time constant shorter than the intervals between the pulses of the curve 5E. This time constant may be adjusted by means of the variable resistor 143, and therefore pulses shown in the curve 5F appear across the output terminals 151, these pulses each having a leading edge determined by the pulses of the curve 5E and an adjustable trailing edge. The pulses of the curve 5F are applied to the cathode of the image tube 16 of Figure 1, and by adjustment of the resistor 143 can be caused to blank this tube during portions of the scanning intervals that the tube would otherwise be unblanked. It is noted that the timing of the pulses in the curve 5F changes each time there is a change in mode in the received subscription television signal. Therefore, by proper adjustment of the resistor 143, the pulses of 5F blank the image tube for certain intervals during one mode of the received signal and for other intervals during the other mode of this signal, thereby eliminating edge flicker in the reproduced image, as fully explained in the aforementioned Gray application.

This invention provides, therefore, improved decoding apparatus for enabling a television receiver to decode and reproduce a subscription type television signal in which the timing between components constituting the signal is altered during spaced operating intervals to effect coding thereof.

The decoding apparatus disclosed herein may be constructed integrally into a receiver, and furthermore finds great utility in that it may be constructed as a separate unit and connected into existing television receivers that are not equipped to reproduce subscription television signals, to adapt such receivers to decode and reproduce such signals of the aforedescribed type.

While a certain specific embodiment of the invention has been shown and described, modifications may be made, and it is intended in the appended claims to cover all such modifications as fall within the true spirit and scope of this invention.

We claim:

1. Decoding apparatus for enabling a television receiver to reproduce images in response to a coded television signal including video and synchronizing components having a time relation that is altered in accordance with a coding schedule, and to a key signal received concurrently with said television signal and having characteristic variations representing said coding schedule, said apparatus comprising: a trigger circuit responsive to an applied control signal for producing recurring output pulses individually initiated when the amplitude of said control signal exceeds a given value; a first control circuit coupled to said trigger circuit and responsive to said synchronizing components for supplying thereto a periodic control signal having in each cycle a sloping portion which exceeds said given amplitude value in fixed time relation with respect to each of said synchronizing components; a second control circuit for developing control pulses; a network for utilizing the aforesaid key signal to supply an actuating signal to said second control circuit to actuate said second control circuit in accordance with said coding schedule; and means for applying said control pulses to said trigger circuit effectively as a pedestal for said periodic control signal thereby to vary in accordance with said schedule the time when the amplitude of said sloping portion of each cycle of said periodic control signal exceeds said given amplitude value.

2. Decoding apparatus for enabling a television receiver to reproduce images in response to a coded television signal including video and synchronizing components having a time relation that is altered by a preselected amount during spaced time intervals, and to a key signal received concurrently with said television signal and having characteristic variations indicating said spaced intervals, said apparatus comprising: a trigger circuit responsive to an applied control signal for producing recurring output pulses individually initiated when the amplitude of said control signal exceeds a given value; a first control circuit coupled to said trigger circuit and including a tuned network resonant at the repetition frequency of said synchronizing components and responsive to said synchronizing components for supplying to said trigger circuit a sine-wave control signal having in each cycle a sloping portion which exceeds said given amplitude value in fixed time relation with respect to each of said synchronizing components; a second control circuit for developing control pulses; a network for utilizing the aforesaid key signal to supply an actuating signal to said second control circuit to actuate said second control circuit during said spaced intervals; and means for applying said control pulses to said trigger circuit effectively as a pedestal for said sine-wave control signal thereby to vary by said preselected amount the time when the amplitude of said sloping portion of each cycle of said control signal exceeds said given amplitude value.

3. Decoding apparatus for enabling a television receiver to reproduce images in response to a coded television signal including video components and vertical- and horizontal-synchronizing components, said video and horizontal-synchronizing components having a time relation that is altered by a preselected amount during spaced intervals and to a key signal received concurrently with said television signal and having characteristic variations indicating said spaced intervals, said apparatus comprising: a trigger circuit responsive to an applied control signal for producing recurrent output pulses individually initiated when the amplitude of said control signal exceeds a given value; a first control circuit coupled to said trigger circuit and responsive to said horizontal-synchronizing components for supplying thereto a periodic control signal having in each cycle a sloping portion which exceeds said given amplitude value in fixed time relation to each of said horizontal-synchronizing components; a second control circuit actuable from a first to a second operating condition for supplying control pulses to said trigger circuit effectively to vary by said preselected amount the time when the amplitude of said sloping portion of each cycle of said control signal exceeds said given amplitude value; and a network responsive jointly to said vertical-synchronizing pulses and said key signal for supplying actuating pulses to said second control circuit during said spaced intervals.

4. Decoding apparatus for enabling a television receiver to reproduce images in response to a coded television signal including video components and vertical- and horizontal-synchronizing components, said video and horizontal-synchronizing components having a time relation that is altered by a preselected amount during spaced intervals and to a key signal received concurrently with said television signal and having characteristic variations indicating said spaced intervals, said apparatus comprising: a trigger circuit responsive to an applied control signal for producing recurrent output pulses individually initiated when the amplitude of said control signal exceeds a given value; a first control circuit coupled to said trigger circuit and responsive to said horizontal-synchronizing components for supplying thereto a periodic control signal having in each cycle a sloping portion which exceeds said given amplitude value in fixed time relation to each of said horizontal-synchronizing components; a second control circuit, actuable from a first to a second operating condition in response to actuating pulses of one polarity and actuable from said second to said first operating condition in response to actuating pulses of a second polarity, for supplying control pulses to said trigger circuit effectively to vary by said preselected amount the time when the amplitude of said sloping portion of each cycle of said control signal exceeds said given amplitude value; and a network responsive to said vertical-synchronizing components for supplying actuating pulses of said one polarity to said second control circuit, and responsive to the joint application of said vertical-synchronizing components and said key signal for supplying actuating pulses of said second polarity to said second control circuit, to cause said second control circuit to produce said control pulses during said spaced intervals.

5. Decoding apparatus for enabling a television receiver to reproduce images in response to a coded television signal including video components and vertical- and horizontal-synchronizing components, said video and horizontal-synchronizing components having a time relation that is altered by a preselected amount during spaced intervals, and to key-signal bursts received over a line circuit and indicating said spaced intervals, said apparatus comprising: a trigger circuit responsive to an applied control signal for producing recurrent output pulses individually initiated when the amplitude of said control signal exceeds a given value; a first control circuit coupled to said trigger circuit and including a tuned network resonant at the repetition frequency of said horizontal-synchronizing components and responsive to said horizontal synchronizing components for supplying to said trigger circuit a sine-wave control signal having in each cycle a sloping portion which exceeds said given amplitude value in fixed time relation to each of said horizontal-synchronizing components; a second control circuit, actuable from a first to a second operating condition for supplying control pulses to said trigger circuit effectively to vary by said preselected amount the time when the amplitude of said sloping portion of each cycle of said control signal exceeds said given amplitude value; a rectifying circuit connected to said line circuit for rectifying said key signal bursts; and a network coupled to said rectifying circuit responsive to said vertical-synchronizing components for supplying actuating pulses of one polarity to said second control circuit, and responsive to the joint application of said vertical-synchronizing components and said rectified key-signal bursts for supplying actuating pulses of a second polarity to said second control circuit, to cause said second control circuit to produce said control pulses during said spaced intervals.

ALBERT COTSWORTH III.
RICHARD O. GRAY.

REFERENCES CITED

The following references are of record in the file of this patent:

UNITED STATES PATENTS

| Number | Name | Date |
|---|---|---|
| 2,244,230 | Andrieu et al. | June 3, 1941 |
| 2,251,525 | Rosenthal | Aug. 5, 1941 |
| 2,401,405 | Bedford | June 4, 1946 |
| 2,402,067 | Mathes | June 11, 1946 |
| 2,405,252 | Goldsmith | Aug. 6, 1946 |
| 2,472,774 | Mayle | June 7, 1949 |
| 2,487,682 | Wendt | Nov. 8, 1949 |